(12) United States Patent
Xia et al.

(10) Patent No.: US 10,173,381 B2
(45) Date of Patent: Jan. 8, 2019

(54) METHOD OF MANUFACTURING A DISTRIBUTED ACOUSTIC SENSING CABLE

(71) Applicant: Halliburton Energy Services, Inc., Houston, TX (US)

(72) Inventors: Hua Xia, Huffman, TX (US); Avinash V. Taware, The Woodlands, TX (US); David A. Barfoot, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/026,883

(22) PCT Filed: Mar. 10, 2015

(86) PCT No.: PCT/US2015/019726
§ 371 (c)(1),
(2) Date: Apr. 1, 2016

(87) PCT Pub. No.: WO2016/144337
PCT Pub. Date: Sep. 15, 2016

(65) Prior Publication Data
US 2017/0259513 A1    Sep. 14, 2017

(51) Int. Cl.
*B29C 71/00*    (2006.01)
*B29C 71/02*    (2006.01)
(Continued)

(52) U.S. Cl.
CPC ........ *B29C 71/0063* (2013.01); *B29C 47/025* (2013.01); *B29C 71/02* (2013.01);
(Continued)

(58) Field of Classification Search
None
See application file for complete search history.

(56) References Cited

U.S. PATENT DOCUMENTS 4,127,370 A * 11/1978 Jackson .................. B29C 47/02
                                                    425/113
4,239,336 A    12/1980 Parfree et al.
(Continued)

FOREIGN PATENT DOCUMENTS

GB            2230109 A      10/1990
WO    WO 2008/132637 A1    11/2008
(Continued)

OTHER PUBLICATIONS

International Search Report and the Written Opinion of the International Search Authority, or the Declaration, dated Nov. 23, 2015, PCT/US2015/019710, 16 pages, ISA/KR.
(Continued)

*Primary Examiner* — Lisa L Herring
(74) *Attorney, Agent, or Firm* — Haynes and Boone, LLP

(57) ABSTRACT

A distributed acoustic sensing cable package having a polymer composite extruded over an optical waveguide to encase the waveguide and to form a crystalline matrix layer acoustically coupled to the waveguide. The crystalline matrix includes reinforcement fibers to further enhance transmission of a cable strain to the optical waveguide. During manufacture of the cable, the polymer composite may be extruded over the optical waveguide and subsequently subjected to heat treatment to increase the crystallinity of the polymer composite and increase the elastic modulus. Both axial and radial strain fields are effectively interact with cased fiber waveguide for producing measurable phase shift signal for distributed acoustic noise detection.

16 Claims, 6 Drawing Sheets

(51) Int. Cl.

| | | |
|---|---|---|
| *B29C 47/02* | (2006.01) | |
| *B29D 11/00* | (2006.01) | |
| *G02B 6/44* | (2006.01) | |
| *G01H 9/00* | (2006.01) | |
| *B29K 71/00* | (2006.01) | |
| *B29K 105/12* | (2006.01) | |

(52) U.S. Cl.
CPC ....... *B29D 11/00663* (2013.01); *G01H 9/004* (2013.01); *G02B 6/4432* (2013.01); *B29C 2071/022* (2013.01); *B29K 2071/00* (2013.01); *B29K 2105/12* (2013.01); *B29K 2995/0041* (2013.01); *G02B 6/4486* (2013.01)

(56) References Cited

U.S. PATENT DOCUMENTS

| | | | |
|---|---|---|---|
| 4,687,293 A | 8/1987 | Randazzo | |
| 4,725,453 A | 2/1988 | Nakasone et al. | |
| 4,818,060 A | 4/1989 | Arroyo | |
| 4,994,668 A | 2/1991 | Lagakos et al. | |
| 5,155,788 A | 10/1992 | Chapin et al. | |
| 5,237,635 A | 8/1993 | Lai | |
| 5,580,918 A * | 12/1996 | Morita ................... | C08L 71/00 524/413 |
| 5,593,736 A * | 1/1997 | Cowen ................. | G02B 6/4402 264/1.38 |
| 5,892,873 A | 4/1999 | Tatat | |
| 6,239,379 B1 * | 5/2001 | Cotter ................. | G02B 6/4416 174/110 R |
| 6,766,091 B2 | 7/2004 | Beuth et al. | |
| 7,313,303 B2 | 12/2007 | Cecchi et al. | |
| 7,397,976 B2 | 7/2008 | Mendez et al. | |
| 7,512,309 B2 | 3/2009 | Aoyagi et al. | |
| 7,603,011 B2 | 10/2009 | Varkey et al. | |
| 7,650,742 B2 | 1/2010 | Ushijima | |
| 7,724,998 B2 | 5/2010 | Parris et al. | |
| 7,760,977 B2 | 7/2010 | Curdt et al. | |
| 7,920,765 B2 | 4/2011 | Varkey | |
| 8,000,572 B2 | 8/2011 | Varkey | |
| 8,204,348 B2 | 6/2012 | Keller et al. | |
| 8,412,011 B2 | 4/2013 | Yasutomi et al. | |
| 8,478,095 B2 | 7/2013 | Takeda et al. | |
| 8,678,041 B2 | 3/2014 | Quigley et al. | |
| 2003/0094281 A1 | 5/2003 | Tubel | |
| 2004/0109650 A1 | 6/2004 | Kim et al. | |
| 2004/0197059 A1 | 10/2004 | Castellani et al. | |
| 2005/0013564 A1 * | 1/2005 | Lee ...................... | G02B 6/4432 385/104 |
| 2006/0260739 A1 * | 11/2006 | Varkey ................. | B29C 47/0004 156/244.12 |
| 2007/0293086 A1 | 12/2007 | Liu et al. | |
| 2008/0118209 A1 * | 5/2008 | Varkey ................. | G02B 6/4486 385/101 |
| 2009/0060430 A1 * | 3/2009 | Reed .................... | G02B 6/4432 385/107 |
| 2009/0250241 A1 | 10/2009 | Galletti et al. | |
| 2009/0297105 A1 * | 12/2009 | Konstadinidis ...... | G02B 6/4402 385/107 |
| 2010/0116510 A1 | 5/2010 | Varkey et al. | |
| 2010/0147548 A1 * | 6/2010 | Bhandari ................ | C08L 71/00 174/110 SR |
| 2011/0142403 A1 * | 6/2011 | Hurley ............. | B29D 11/00663 385/102 |
| 2011/0308788 A1 | 12/2011 | Ravi | |
| 2012/0111104 A1 | 5/2012 | Taverner et al. | |
| 2012/0222487 A1 | 9/2012 | Hill et al. | |
| 2013/0194105 A1 | 8/2013 | Nash et al. | |
| 2013/0280420 A1 | 10/2013 | Inderberg et al. | |
| 2013/0330052 A1 * | 12/2013 | Thackston .......... | G02B 6/4471 385/137 |
| 2014/0208855 A1 | 7/2014 | Skinner | |

FOREIGN PATENT DOCUMENTS

| | | |
|---|---|---|
| WO | WO 2013/090544 A1 | 6/2013 |
| WO | WO 2013/183182 A1 | 12/2013 |
| WO | WO 2014/081629 A1 | 5/2014 |
| WO | WO 2014/186165 A1 | 11/2014 |

OTHER PUBLICATIONS

International Search Report and the Written Opinion of the International Search Authority, or the Declaration, dated Nov. 24, 2015, PCT/US2015/019720, 17 pages, ISA/KR.

International Search Report and the Written Opinion of the International Search Authority, or the Declaration, dated Dec. 23, 2015, PCT/US2015/019726, 13 pages, ISA/KR.

Miller, et al., "Vertical Seismic Profiling Using a Fibre-Optic Cable as a Distributed Acoustic Sensor," 74$^{th}$ EAGE Conference & Exhibition Incorporating SPE EUROPEC, Copenhagen, Denmark, Jun. 4-7, 2012.

* cited by examiner

METHOD OF MANUFACTURING A DISTRIBUTED ACOUSTIC SENSING CABLE

The present application is a U.S. National Stage patent application of International Patent Application No. PCT/US2015/019726, filed on Mar. 10, 2015, the benefit of which is claimed and the disclosure of which is incorporated herein by reference in its entirety.

FIELD OF THE INVENTION

The invention relates to wellbore drilling and production operations, and more particularly to methods and systems for downhole leakage detection and vertical seismic profiling in wellbores. Most particularly, the invention relates to a distributed acoustic sensing cable package and methods of manufacture.

BACKGROUND OF THE INVENTION

Distributed acoustic sensing (DAS) technology has become a potential downhole acoustic logging tool for wellbore hydrocarbon fluid leakage detection and vertical seismic profiling, replacing more traditional single-point sensors such as hydrophone and geophone. This technology employs a fiber optic sensing cable disposed in the wellbore to listen to acoustic noise(s) that may arise from tubing, casing, cement, the casing annulus, the formation, wellbore fluids, wellbore equipment or other artificial sources. The optic fiber sensing cable functions as a continuous acoustic geophone or hydrophone for vertical seismic profiling, fracturing, and flow detections of which some flows could be leakage flows. However, use of DAS technology has been limited by the challenge of clearly interpreting measured acoustic data because of weak acoustic detection sensitivity of the sensing cable. One issue is that existing acoustic sensing cables do not effectively translate external acoustic field energy variations into measurable phase shifts because of ineffective strain coupling efficiency.

More specifically, DAS cables have to transfer wellbore structural deformation into fiber sensing cable elongation or compression, which leads to refractive indices variation in the fiber core. These elastic and optical strain effects can be measured and utilized to identify a parameter change in the vicinity of the localized strain. Known DAS cables have limited axial sensitivity due to strain-free package requirements and diminished transverse strain or radial sensitivity, and thus, are not well suited to detect weak acoustic signals that may signify a condition within the wellbore or surrounding formation. In other words, these cable package designs have only a limited range of detection sensitivity in longitudinal or axial direction. Despite great efforts made in system hardware, electronic circuits, modeling and signal processing, weak acoustic detection sensitivity is still one of the barriers preventing DAS technology from becoming a reliable and robust downhole acoustic logging tool.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION OF THE INVENTION

Figure 1:
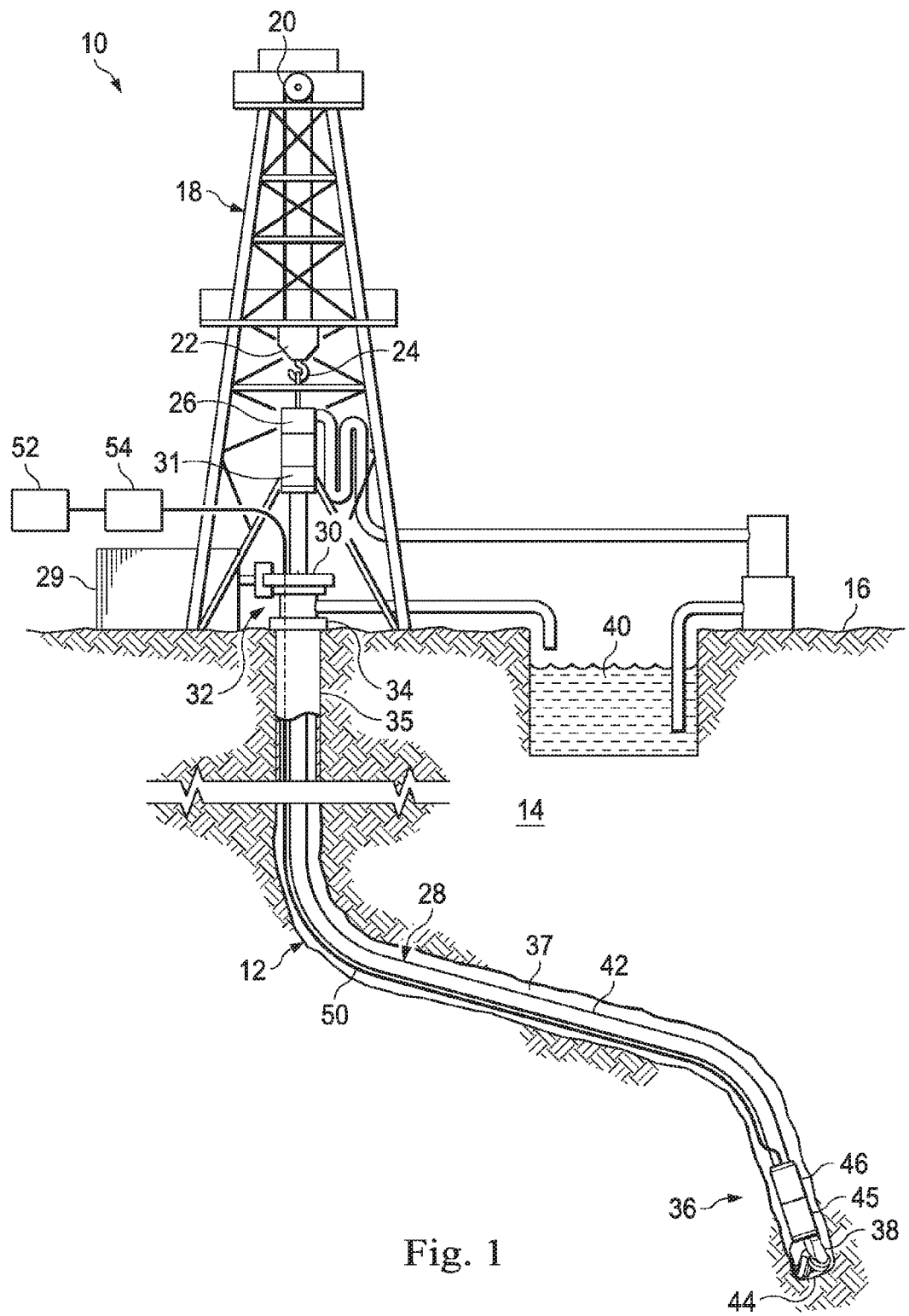
FIG. 1 illustrates an embodiment of a distributed acoustic sensing cable of the disclosure deployed in a land-based drilling operation.

The disclosure may repeat reference numerals and/or letters in the various examples or Figures. This repetition is for the purpose of simplicity and clarity and does not in itself dictate a relationship between the various embodiments and/or configurations discussed. Further, spatially relative terms, such as beneath, below, lower, above, upper, uphole, downhole, upstream, downstream, and the like, may be used herein for ease of description to describe one element or feature's relationship to another element(s) or feature(s) as illustrated, the upward direction being toward the top of the corresponding figure and the downward direction being toward the bottom of the corresponding figure, the uphole direction being toward the surface of the wellbore, the downhole direction being toward the toe of the wellbore. Unless otherwise stated, the spatially relative terms are intended to encompass different orientations of the apparatus in use or operation in addition to the orientation depicted in the Figures. For example, if an apparatus in the Figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Moreover even though a Figure may depict a horizontal wellbore or a vertical wellbore, unless indicated otherwise, it should be understood by those skilled in the art that the apparatus according to the present disclosure is equally well suited for use in wellbores having other orientations including vertical wellbores, slanted wellbores, multilateral wellbores or the like. Likewise, unless otherwise noted, even though a Figure may depict an offshore operation, it should be understood by those skilled in the art that the apparatus according to the present disclosure is equally well suited for use in onshore operations and vice-versa. Further, unless otherwise noted, even though a Figure may depict a cased hole, it should be understood by those skilled in the art that the apparatus according to the present disclosure is equally well suited for use in open hole operations.

Generally, in one or more embodiments, a distributed acoustic sensing (DAS) cable is provided wherein a crystalline, high-temperature polymeric composite material is extruded around an optical fiber to encase the optical fiber in a polymer composite that greatly enhances the optical fiber's "listening" capability or sensitivity to cable elongation effect, thermo-optic effect, and elasto-optic effect. The polymer composite consists of polymer, strengthened with reinforcement fibers such as carbon fibers, ceramic fiber, metallic fiber or the like. The polymer composite, having a crystalline structure and directly encasing the optical fiber, has significantly improved coupling over "loose fiber" cables common in the prior art, and effectively converts external longitudinal and transverse stress to fiber core. The refractive index of the fiber core is perturbed by strain-optic effect that results in a measurable phase shift from optical fiber using coherent Rayleigh scattering reflectometry techniques.

FIG. 1 is an elevation view in partial cross-section of a drilling system 10 utilized to drill a wellbore 12 extending through various earth strata in an oil and gas formation 14 located below the earth's surface 16. Drilling system 10 may include a drilling rig 18, such as the land drilling rig shown in FIG. 1. Drilling rig 18 may include a hoisting apparatus 20, a travel block 22, a hook 24 and a swivel 26 for raising and lowering pipe strings 28, such as a substantially tubular, axially extending drill string. Likewise, drilling rig 12 may include rotary table 30, rotary drive motor 29, and other equipment associated with rotation and/or translation of tubing string 28 within a wellbore 12. For some applications, drilling rig 18 may also include a top drive unit 31. Although drilling system 10 is illustrated as being a land-based system, drilling system 10 may be deployed on offshore platforms, semi-submersibles, drill ships, and the like.

Drilling rig 18 may be located proximate to or spaced apart from a well head 32, such as in the case of an offshore arrangement. One or more pressure control devices 34, such as blowout preventers and other equipment associated with drilling or producing a wellbore may also be provided at well head 32.

Wellbore 12 may include a casing string 35 cemented therein. Annulus 37 is formed between the exterior of tubing string 28 and the inside wall of wellbore 12 or casing string 35, as the case may be.

The lower end of drill string 28 may include bottom hole assembly 36, which may carry at a distal end a rotary drill bit 38. Drilling fluid 40 may be pumped to the upper end of drill string 28 and flow through the longitudinal interior 42 of drill string 28, through bottom hole assembly 36, and exit from nozzles formed in rotary drill bit 38. At bottom end 44 of wellbore 12, drilling fluid 40 may mix with formation cuttings, formation fluids and other downhole fluids and debris. The drilling fluid mixture may then flow upwardly through annulus 37 to return formation cuttings and other downhole debris to the surface 16.

Bottom hole assembly 36 may include a downhole mud motor 45. Bottom hole assembly 36 and/or drill string 28 may also include various other tools 46 including MWD, LWD instruments, detectors, circuits, or other equipment that provide information about wellbore 12 and/or formation 14, such as logging or measurement data from wellbore 12. Measurement data and other information may be communicated using measurement while drilling techniques using electrical signals or other telemetry that can be converted to electrical signals at the well surface to, among other things, monitor the performance of drilling string 28, bottom hole assembly 36, and associated rotary drill bit 32.

Shown deployed in wellbore 12 of FIG. 1 is a distributed acoustic sensing cable 50 having a crystalline, high-temperature polymeric material extruded over an optical fiber to encase the optical fiber and form an acoustic transmission layer acoustically coupled to the optical fiber, as described in more detail below. Generally, distributed acoustic sensing cable 50 may be in communication with a light source 52, such as a laser, and an interrogator 54 to detect return light technically termed as backscattered light. Light source 52 and/or interrogator 54 may each be located adjacent drilling rig 18, or otherwise deployed along the drilling system 10, such as within wellbore 12. In one or more embodiments, a plurality of distributed acoustic sensing cables 50 may extend along wellbore 12. The plurality of distributed acoustic sensing cables 50 may be spaced apart around wellbore 12 to form a two-dimensional array. In one or more embodiments, multiple distributed acoustic sensing cables 50 can be placed at different azimuths about wellbore 12. Interrogator 54 may include a dense wavelength division multiplexing (DWDM) switch to combine multiple wavelengths on a single optical fiber. Moreover, in one or more embodiments, multiple cables 50 may be deployed in wellbore 12, such as for example a first cable 50 cemented within annulus 37,—a second cable 50 disposed along the interior of casing string 35 and a third cable 50 clamped to tubing string 28. Thus, interrogator 54 may also include, with or without a DWDM switch, an optical coupler to switch between cables. Likewise, the foregoing arrangement may be utilized, in the case of a single cable, but with multiple fibers.

In one or more embodiments, distributed acoustic sensing cable 50 may be positioned so as to be in direct or indirect contact with formation 14. In one or more embodiments, to the extent wellbore 12 is cased, as indicated by casing 35, the distributed acoustic sensing cable 50 may be attached or otherwise carried on the interior or exterior of the casing 35, otherwise disposed in annulus 37 or carried externally or internally by or on tubing string 28 deployed in wellbore 12. Persons of skill in the art will appreciate that casing 35 may be cemented in place within wellbore 12, and in such case, distributed acoustic sensing cable 50 may be deployed in the cement. Moreover, distributed acoustic sensing cable 50 may be temporarily or permanently installed within wellbore 12.

Figure 2:
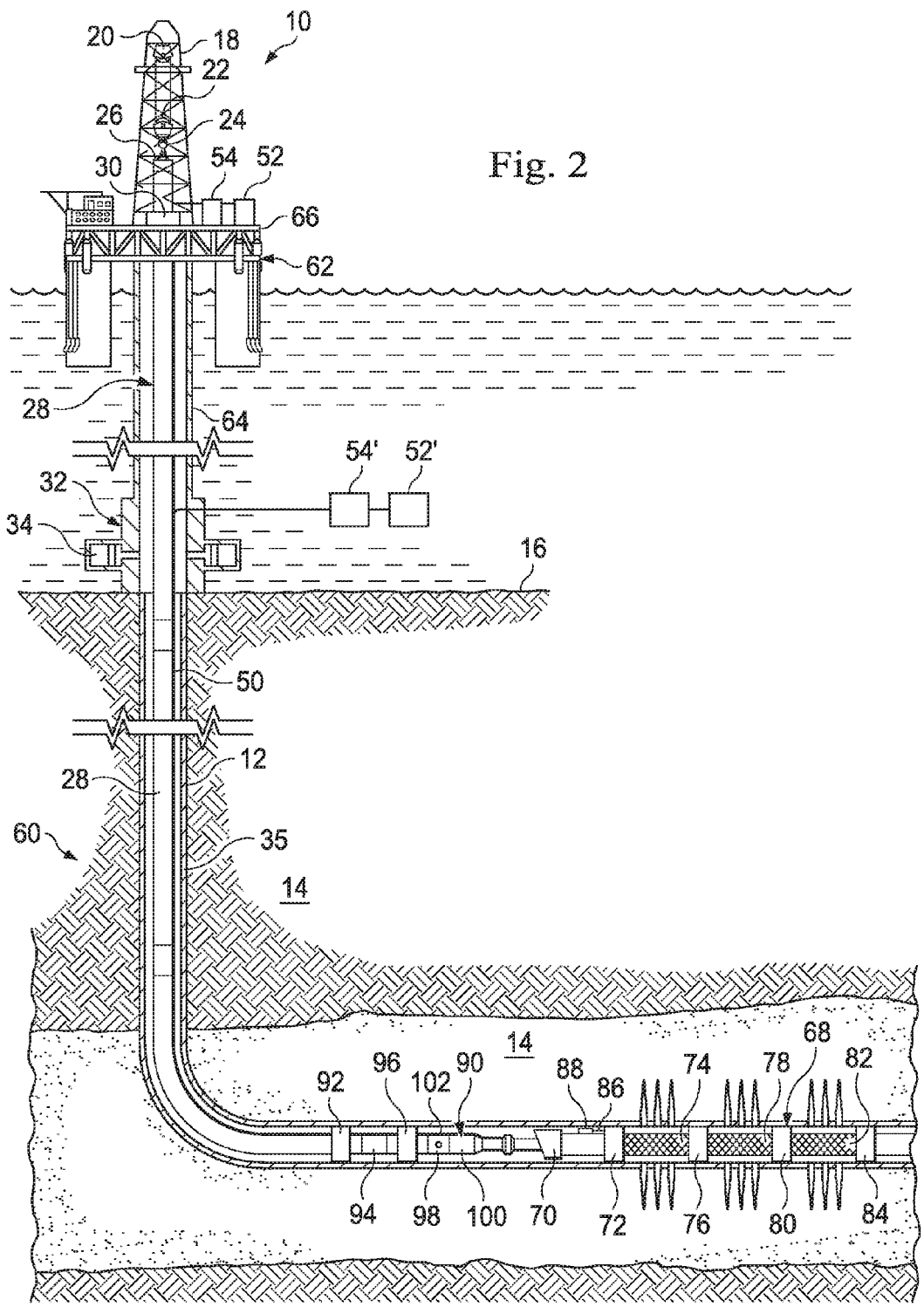
FIG. 2 illustrates an embodiment of a distributed acoustic sensing cable of the disclosure deployed in a marine production operation.

FIG. 2 illustrates distributed acoustic sensing cable 50 deployed in a completion and production system 60. Drilling and production system 60 includes a drilling rig 18 which may be mounted on an oil or gas platform 62, such as illustrated in the offshore platform shown in FIG. 2. For offshore operations, whether drilling or production, subsea conduit 64 extends from deck 66 of platform 62 to a subsea wellhead installation 32, including pressure control devices 34. Tubing string 28 extends down from drilling rig 18, through subsea conduit 64 and into wellbore 12.

Disposed in a substantially horizontal portion of wellbore 12 is a lower completion assembly 68 that includes various tools such as an orientation and alignment subassembly 70, a packer 72, a sand control screen assembly 74, a packer 76, a sand control screen assembly 78, a packer 80, a sand control screen assembly 82 and a packer 84.

Extending downhole from lower completion assembly 68 is one or more communication cables 86, such as a sensor or electric cable, that passes through packers 72, 76 and 80 and is operably associated with one or more electrical devices 88 associated with lower completion assembly 68, such as sensors position adjacent sand control screen assemblies 74, 78, 82 or at the sand face of formation 14, or downhole controllers or actuators used to operate downhole tools or fluid flow control devices. Cable 86 may operate as communication media, to transmit power, or data and the like between lower completion assembly 68 and an upper completion assembly 90.

In this regard, disposed in wellbore 12 at the lower end of tubing string 28 is an upper completion assembly 90 that includes various tools such as a packer 92, an expansion joint 94, a packer 96, a fluid flow control module 98 and an anchor assembly 100.

Extending uphole from upper completion assembly 90 are one or more communication cables 102, such as a sensor cable or an electric cable, which passes through packers 92, 96 and extends to the surface 16 in annulus 34. Cable 102 may operate as communication media, to transmit power, or data and the like between a surface controller (not pictured) and the upper and lower completion assemblies 90, 68.

Shown deployed in wellbore 12 of FIG. 2 is a distributed acoustic sensing cable 50 described in more detail below. In one or more embodiments, one or more of cables 102 and cables 86 may be acoustic sensing cable 50. Generally, distributed acoustic sensing cable 50 may be in communication with a light source 52, such as a laser, and an interrogator 54 to detect return light. Light source 52 and/or interrogator 54 may each be located adjacent drilling rig 18, or otherwise deployed along production system 60, such as within wellbore 12. In one or more embodiments, as shown by light source 52' and/or interrogator 54', one or more of these components, particularly in marine operations, may deployed on the sea floor 16 adjacent the wellhead 32 in order to eliminate the need for very long lead-in cable 50 that would be required to go down the riser or other structure from the sea floor to the offshore production platform on the surface. Interrogator 54 or 54' may include a dense wavelength division multiplexing (DWDM) switch to combine multiple wavelengths on a single optical fiber. Moreover, in one or more embodiments, multiple cables 50 may be deployed in wellbore 12, such as for example a first cable 50 cemented within annulus 37, a second cable 50 disposed along the interior of casing string 35 and a third cable 50 clamped to tubing string 28. Thus, interrogator 54 may also include, with or without a DWDM switch, an optical coupler to switch between cables. Likewise, the foregoing arrangement may be utilized, in the case of a single cable, but with multiple fibers. Distributed acoustic sensing cable 50 may be deployed in wellbore 12 of FIG. 2 as described above with respect to FIG. 1.

Figure 3:
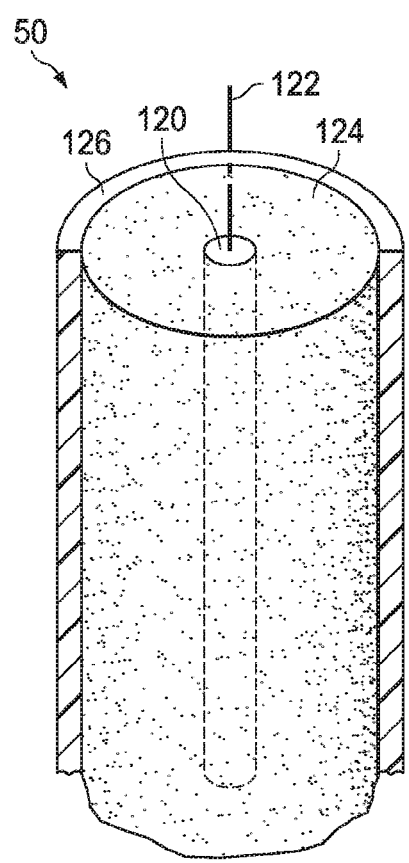
FIG. 3 illustrates an optical fiber embedded in a polymer composite in accordance with embodiments of the disclosure.
Figure 6:
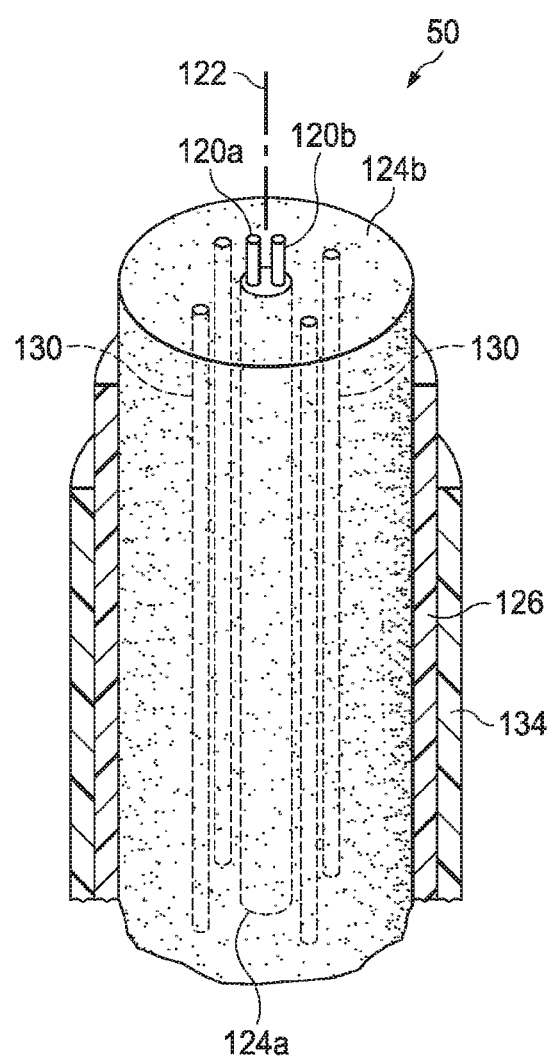
FIG. 6 illustrates an optical fiber embedded in a polymer composite reinforced with elongated fiber strands in accordance with embodiments of the disclosure.

FIG. 3 illustrates an elevation sectional depiction of one or more embodiments of distributed acoustic sensing cable 50. Cable 50 is shown having an optical waveguide 120 disposed along the primary axis 122 of cable 50. Although a single waveguide 120 is illustrated, cable 50 may include multiple waveguides 120 (such as illustrated in FIG. 6.) A polymer composite 124 is extruded over waveguide 120 forming a polymer composite layer and encases waveguide 120 such that waveguide 120 is acoustically coupled to the polymer composite 124. In one or more embodiments, a protective sheath 126 may also be provided around polymer composite layer 124. The preferred sheath material may be a corrosion-resistant polymer material such as carbon fiber doped polyetherketone (c-PEEK) and metal-wire enhanced polyetherketone (m-PEEK) with crystalline microstructures.

The polymer material forming polymer composite 124 is characterized by a crystalline structure, as opposed to an amorphous structure. For purposes of this disclosure, the crystallinity of polymers is characterized by their degree of crystallinity, ranging from "zero" for a completely non-crystalline polymer, i.e., an amorphous structure, to "one" for a theoretical completely crystalline polymer. In any event, it has been found that for the purposes of cable 50, a polymer composite 124 exhibiting at least some degree of crystallinity enhances coupling between the exterior of cable 50 and optical waveguide 120. Crystalline polymers, as compared to amorphous polymers, are more resistant to chemicals and corrosion, and are also more resistant to environmental stress cracking because of the presence of the crystalline structure. Moreover, polymers with crystalline regions are generally tougher (can be bent more without breaking) and more impact-resistant than totally amorphous polymers. Additionally, crystalline polymers also tolerate higher temperatures without losing mechanical strength for longer time periods than amorphous polymers. In one or more embodiments, polymer composite 124 has a crystallinity of at least 20% by volume, while in other embodiments, polymer composite 124 has a crystallinity of at least 30% by volume. In one or more embodiments, polymer composite 124 has a crystallinity of no more than 70% by volume, although in other embodiments, crystallinity may be higher. In another embodiment, a middle-range percentage of crystallinity will be controlled to ensure a proper flexural strength for cable spooling operation.

Moreover, in one or more embodiments, the material of the polymer composite is selected to have a melting temperature ($T_m$) of at least 200° C. in order to withstand the high temperatures common in downhole environments. While polymers with either an amorphous structure or a crystalline structure may exhibit melting temperature $T_m$ of at least 200° C., amorphous polymers tend to have a glass transition temperature ($T_g$) that is much closer the melting temperature $T_m$ of the amorphous polymers. The glass transition temperature $T_g$ of a polymer material indicates a starting point for degradation of the mechanical strength and elastic modulus of the polymer. Thus, with a glass transition temperature $T_g$ that is close to the melting temperature $T_m$, the strength of amorphous polymers can significantly degrade when the operation temperature overpasses the $T_g$. While the strength of a full crystallized polymer will also degraded when the operation temperature is higher than its glass transition temperature $T_g$, the degradation trend is much more moderate even when approaching the melting point temperature $T_m$ of the crystalline polymer. In this regard, some crystalline polymers may still maintain sufficient mechanical strength of room-temperature performance within 10% approaching its melting temperature $T_m$.

Figure 4:
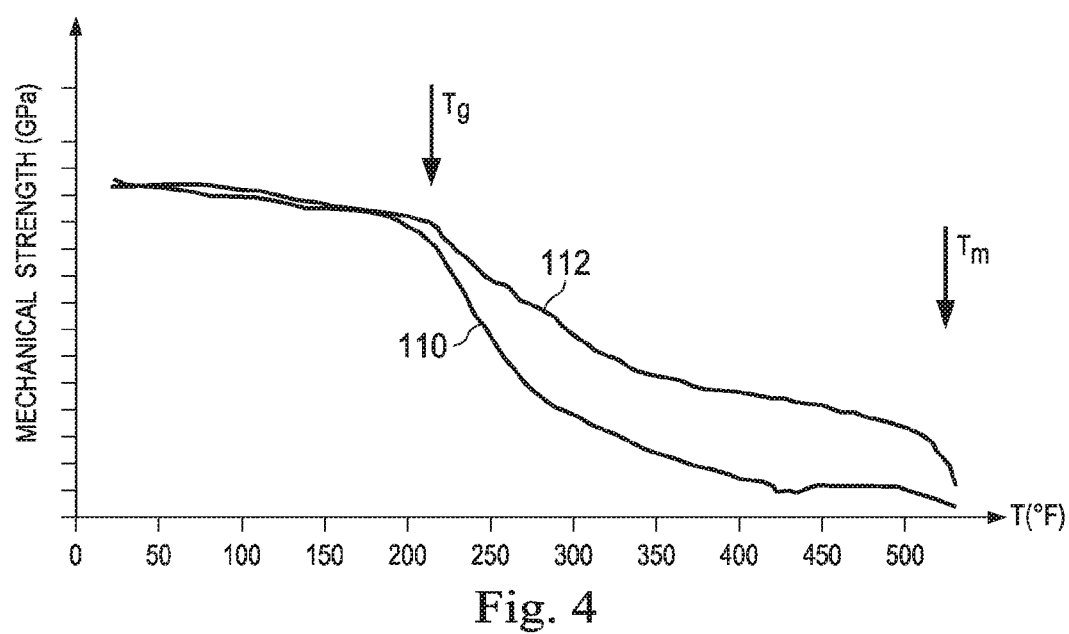
FIG. 4 illustrates the mechanical strength variation under elevated temperatures of a typical amorphous polymer and a typical crystalline polymer.

FIG. 4 illustrates the mechanical strength variation in Giga-pascals (GPa) under elevated temperatures of a typical amorphous polymer (represented by line 110) and a typical crystalline polymer (represented by line 112), where the degradation of the amorphous polymer 110 is much dramatic after glass transition temperature $T_g$. While the crystalline polymer 112 exhibits obvious degradation, it still can maintain certain mechanical strength and gradually extended into much higher temperatures. With respect to cable 50, this level of consistency is even better if the operation temperature of cable 50 is not much higher than the $T_g$ but far below $T_m$. Amorphous polymers 110 are usually hard and brittle when $T<T_g$ because of the low mobility of their molecules. Increasing the temperature induces molecular motion resulting in the typical rubber-elastic properties. A constant force applied to a polymer at temperatures above Tg results in a viscoelastic deformation, i.e., the polymer begins to creep. Thus, heat resistance for amorphous polymers is typically identified as a temperature just below the glass transition temperature $T_g$. However, relatively strong intermolecular forces in crystalline polymers prevent softening even above the glass transition temperature. The elastic modulus of crystalline polymers changes significantly only at high (melting) temperature. Without limiting the foregoing, in one or more embodiments, polymer composite 124 (FIG. 3) may be formed of one or more high-temperature polyetheretherketone (PEEK), polyimide (PI) and polyphenylene sulfide (PPS), polyetherketone (PEEK), carbon fiber doped polyetherketone (c-PEEK) and metal-wire enhanced polyetherketone (m-PEEK), and Polyaryletherketone (PAEK), or combinations of any of the foregoing.

Polyphenylene sulfide (PPS) polymer, for example, is an engineering polymer whose structure is composed of benzene and sulfur and is a partially crystalline, high temperature performance polymer that has the chemical structure. Its melting point is +285° C., excellent chemical resistance and is inherently flame retardant. It possesses self-extinguishing properties without the addition of any flame retardant chemical additives.

To mitigate potential polymer softening led elastic modulus reduction when the service temperature is higher than its glass temperature, in one or more embodiments a first polymer having a comparatively high $T_g$ is mixed with a second polymer selected to have a desired crystalline structure. For example, polyimide PI has a high $T_g$ (320° C.), but a PEAK material has a much lower $T_g$ (145° C.), the mixed polymer composite material could be of much better mechanical strength than regular PEAK material at a service temperature of 145° C. if the volumetric percentage of the PI material in PEAK is comparable. Using this method, depending upon real operation temperature, these mixed polymers provide a versatile choice to customize a combination of the materials of polymer composite 124 for fabricating a high performance distributed acoustic sensing cable 50.

Turning back to FIG. 3, thus, in one or more embodiments, a first polymer comprising composite polymer composite 124 may be characterized by a glass transition temperature $T_g$ of a first temperature and a first elastic modulus, and a second polymer comprising composite polymer composite 124 may be characterized by a glass transition temperature $T_g$ and an elastic modulus higher than the first temperature and first elastic modulus of the first polymer material. In one or more embodiments, the first temperature is at least 90° C. and the first elastic modulus is at least 100 GPa.

In an alternative arrangement, a first polymer composite 124a (FIG. 6) may be coated on waveguide 120, extruded over waveguide 120 or otherwise directly coupled to waveguide 120, after which a second polymer composite 124b (FIG. 6), which may be the same or a different material than the first polymer, may be extruded over the first polymer to encase the first polymer. For example, the optical wave guide 120 may first be coated with polyimide (PI) as the first polymer and then be encased in polyetheretherketone (PEEK), polyimide (PI) and polyphenylene sulfide (PPS) as the second polymer.

As used herein, "optical waveguide" includes one or more optical waveguides (such as optical fiber(s), optical ribbon(s) and other types of optical waveguides). Thus, in one or more embodiments, optical waveguide 120 may be one or more optical fibers. In one or more embodiments, waveguide 120 may be one single-mode (SM) fiber or several single-modes (SM) fibers or a multi-mode (MM) mixed optical fibers. In any case, preferably the fibers are zero-dispersive. In one or more embodiments, a single-mode (SM) optical fiber is made of fluorine-doped silicon dioxide clad and pure silicon dioxide fiber core. In other embodiments, the single-mode (SM) fiber is polarization maintained elliptic or asymmetric multicore structure with high birefringent sensitivity. In one or more embodiments, a multimode (MM) optical fiber may be manufactured from fluorine-doped silicon dioxide double-clad with a pure silicon dioxide fiber core of 50-62.5 micrometer diameter and gradient refractive index profile. The optical fibers may have a protective layer, either a polyimide or a carbon layer, such as for example, an approximately 20 micrometer thick layer. In multi-fiber arrangements, a single-mode (SM) fiber may be used for distributed acoustic signal detection, while a looped back multi-mode (MM) optical fibers may be used to evaluate potential hydrogen darkness effects. In embodiments with more than three fibers, additional fibers can be used for telemetry for transferring sensing data from additional sensors, such a temperature compensated pressure gage (not shown) installed at the distal end of the cable 50.

While not intending to limit the disclosure herein, an exemplary cable 50 may be formed of a single-mode (SM) fiber core of approximately 10 micron meters in diameter, a polyimide polymer of approximately 20 micron meters in thickness coated on the fiber core, and a crystalline polymer layer or cladding of approximately 125 micron meters encasing the coated core.

Protective sheath 126 may also be provided around polymer composite 124 forming a protective layer against wearing and corrosion. In one or more embodiments, protective sheath 126 also may be formed of a semi-crystalline polymer, such as polyetheretherketone (PEEK), Kapton, polyimide or the like, including any of the polymers of which polymer composite 124 is formed. The preferred sheath material may be a corrosion-resistant polymer material, such as carbon fiber doped polyetherketone (c-PEEK), metal-wire enhanced polyetherketone (m-PEEK), or Polyaryletherketone (PAEK) with crystalline microstructures.

In addition, preferably, in order to ensure a satisfactory coupling between the outside of cable 50 and optical waveguide 120 and optimize strain wavefield transmission, the acoustic impedance of the outer protection polymer layer 126 is lower than the optical cable package. In one or more embodiments, the acoustic impedance of at least one of the crystalline polymers of cable 50 is between 2-10 Mega-Rayls where 1 Rayl represents the specific acoustic impedance when a sound pressure of 1 Pascal produces a linear velocity of 1 m/s.

Figure 5:
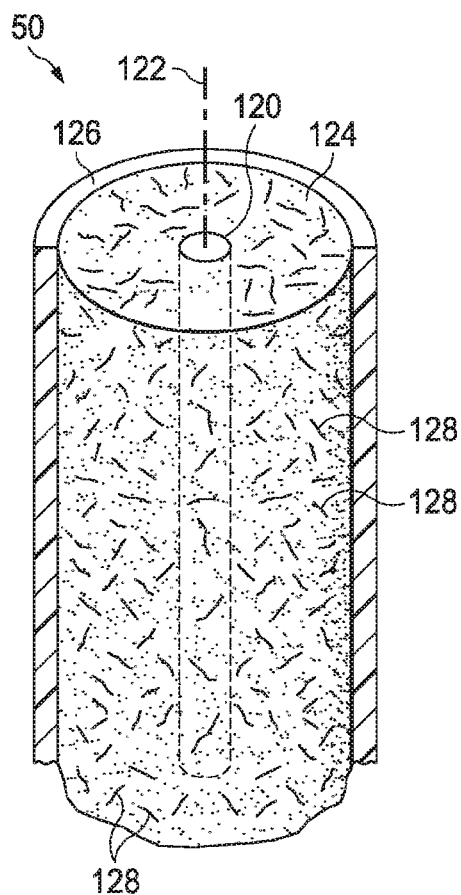
FIG. 5 illustrates an optical fiber embedded in a polymer composite reinforced with chopped fiber in accordance with embodiments of the disclosure.

Turning to FIG. 5, an elevation sectional depiction of one or more alternative embodiments of distributed acoustic sensing cable 50 is shown. Cable 50 is similar to the cable 50 illustrated in FIG. 3, but includes reinforcement material 128 embedded in polymer composite 124 encasing optical waveguide 120. In one or more preferred embodiments, the reinforcement material 128 may be chopped fiber as illustrated in FIG. 5 for controlling flexural strength. In one or more embodiments, the chopped fibers are approximately one to four inches in length, while in other embodiments the chopped fibers may be shorter or longer in length. In one or more embodiments, the chopped fibers comprise a multicity of reinforcement fibers embedded throughout the polymer composite 124. In this regard, as mechanical strength of the crystalline material forming polymer composite 124 may be potentially reduced by service temperature, the introduction of reinforcement material 128 can be used as a composite material to improve mechanical strength of polymer composite 124, where the mechanical strength could be averaged by $$E(\text{composite}) = f \cdot E(\text{reinforced fiber}) + (1-f) \cdot E(\text{polymer}), \quad (1)$$

or $$1/E(\text{composite}) = f/E(\text{reinforce fiber}) + (1-f)/E(\text{polymer}), \quad (2)$$

where E is Young modulus and f is friction of the reinforcement fiber material, and the volumetric percentage of the voids and optical fiber may be ignored if its fraction ratio is small. In one or more embodiments, the reinforcement material 128 may be carbon fibers, ceramic fibers, glass fibers, synthetic fibers or metallic fibers. In one or more embodiments, the reinforcement material 128 may be two or more different types of fiber embedded in the polymer composite.

In one or more embodiments, carbon fiber may be more preferred because of its comparable coefficient of thermal expansion (CTE) to optical fiber ($0.5\text{-}0.6 \times 10^{-6}$ 1/° C.) that could mitigate residual stress during manufacturing process. In addition, carbon fibers have higher (150-700 GPa) tensile modulus than other reinforcement fiber.

In one or more embodiments, metal fibers may be selected from the group consisting of ferromagnetic and non-ferromagnetic fibers such as stainless steel fibers, Ni-alloy fibers, and Se—CO fibers. This reinforcement material may transfer external magnetic effect to fiber material that could enhance strain coupling by magnetostrictive effect.

In any event, when reinforcement fibers are added to or mixed with the crystalline polymer as described herein so as to be embedded within the polymer composite, certain physical properties of the polymer composite can be varied to yield an acoustic sensing cable tailored to a particular downhole operational environment. Such properties may include acoustic coupling, mechanical strength in tensile strength, elastic modulus, and flexural modulus, and will provide wide freedom for manufacturing an acoustic sensing cable with a desired set of operational parameters. In this regard, during mixing the volumetric percentage of the polymer composite and reinforcement fiber may be adjusted. In one or more embodiments, the volumetric percentage of reinforcement fibers in the polymer composite is from approximately 10% to approximately 70%.

For a particular operation, it may be desirable to further enhance the strength of cable 50 in a particular direction, such as axially or radially or at a select angle therebetween. In such case, at least a portion of the reinforcement fibers may be aligned in a select direction along a portion of the length of the cable 50. For example, in one or more embodiments, the reinforcement fibers may be primarily aligned radially, i.e., at an angle of approximately 90 degrees to the elongated axis of cable 50, while in other embodiments, the reinforcement fibers may be aligned primarily parallel with the elongated axis of cable 50. Alternatively a first portion of the reinforcement fibers are aligned in a first direction and a second portion of the reinforcement fibers are aligned in a second direction different from the first direction.

Turning to FIG. 6, an elevation sectional depiction of one or more alternative embodiments of distributed acoustic sensing cable 50 is shown. Cable 50 is similar to the cable 50 illustrated in FIG. 3, but includes at least two optical waveguide 120a, 120b disposed along the primary axis 122 of cable 50. A polymer composite 124 is extruded over waveguides 120a, 120b and encases waveguides 120a, 120b such that waveguides 120a, 120b are acoustically coupled to the layer formed by polymer composite 124. In other words, the polymer composite 124 forms an acoustic transmission layer coupled to waveguides 120a, 120b. In the illustrated embodiment, polymer composite 124 is comprised of a first polymer composite 124a coating or otherwise encasing waveguide 120 and a second polymer composite 124b encasing or otherwise extruded around first polymer composite 124a. A protective sheath 126 may be provided around polymer composite 124.

As an alternative or in addition to the reinforcement material 128 shown in FIG. 5, reinforcement material may also be provided as elongated reinforcement strands 130, shown in FIG. 6, which may be embedded in polymer composite 124 and extend substantially along axis 122 of cable 50. In one or more embodiments, strands 130 may be braided and embedded in polymer composite 124. In one or more embodiments, the braided strands may form a sheath which is embedded in polymer composite 124 and disposed around optical waveguide 120. In this regard, the braided reinforced fibers may have an angle relative to axis 122 of 0° and 90° braided textural structure, while in other embodiments, 45° braided structural texture, and yet in other embodiments, a ±45° alternating braided surface texture. In this regard, the reinforced fibers 130 may have different angles relative to aligned with cable axis. 0° alignments will make cable resistant to longitudinal bending and axial tension and compression. ±45° alignments with axis 122 improve torsional strength of cable 50. 90° alignments with axis 122 will reduce cable pressure sensitivity and maintain its solid shape. However, since cable 50 may be subjected to mechanical loads from different directions, reinforced fibers 130 may have alignments in some intermediate angles relative to axis 122. For example, ±15° alignments may improve resistance to bending with tension, while ±65° alignments with axis 122 may improve susceptibility to cable bucking. In one or more other embodiments, for optimum cable strength, reinforcement strands 130 may be braided with an angle of 45°±20° around axis 122 and optical fiber 120. In one or more embodiments, the strands 130 may be comprised of any one of the materials identified herein for reinforcement material 128. In one or more embodiments, strands 130 may comprise a metallic fiber, such as stainless steel, reinforced polyphenylene sulfide (SS-PPS).

In one or more embodiments, an additional strength sheath 134 may be provided about protective polymer composite 124, either directly around polymer composite 124, or about a protective layer, such as protective layer 126. In one or more embodiments, strength sheath 134 may comprise reinforcement material 128, such as strands 130, which may be braided and disposed about axis 122 as an external layer.

As will be appreciated by persons of skill in the art, a distributed acoustic cable listening to acoustic noise(s) inherently requires every section of the cable 50 to be an acoustic sensor that has high dynamic strain sensitive to respond to axial strain and radial strain, induced by surrounding medium deformation. In general, external mechanical deformation normally induces axial and transverse strain loading on a section of the acoustic sensing cable. The longitudinal strain will change fiber refractive index ($n_z$) by the cable relative elongation ($\Delta L/L$), while the transverse strain will also change fiber refractive indices ($n_x$, $n_y$) by birefringent or photoelastic effect. The phase shift induced by longitudinal strain and thermal strain can be described as follows:

$$\Delta\varphi/\varphi = \Delta L/L + \Delta n_{th}/n + \Delta n_{\sigma}/n + \Delta d/d \quad (3)$$

where the first term on the right represents axial strain mainly due to mechanical dynamic strains $\varepsilon_m(t)$ and thermal strain or elongation, second term is thermal induced refractive index change, and third term is external stress induced refractive index change. The forth term reflects the fiber diameter variation by external stress. These variables can be written as $$\Delta L/L = \xi \cdot \varepsilon_m(t) + \alpha \cdot \Delta T, \quad (4)$$

$$\Delta n_{th}/n = \beta \cdot \Delta T, \, \varepsilon(r) = \Delta d/d, \quad (5)$$

$$\Delta n_{\sigma}/n = -\xi \cdot (n^2/2E) \cdot \sigma_z \cdot [(1-\nu) \cdot p_{12} - \nu \cdot p_{11}], \quad (6)$$

where $0 < \xi \le 1$ reflects a coupling parameter for a fiber response to external strain variation, while $\alpha \cdot \Delta T$ reflects thermal strain in the fiber that is proportional to the product of the coefficient of thermal expansion ($\alpha$) and temperature incremental ($\Delta T$), $\beta$ is fiber material thermo-optic coefficient ($\sim 8.6 \times 10^{-6}$ $1/°$ C.), $p_{11}$ and $p_{12}$ are elasto-optic coefficients of the fiber material, and $\nu$ is the Poisson ratio of the optical fiber. Actually, Eq. (6) corresponds to a loosed fiber cable package with only longitudinal stress coupling of $\xi \ll 1$, where the axial stress leads to relative refractive index change.

Figure 7:
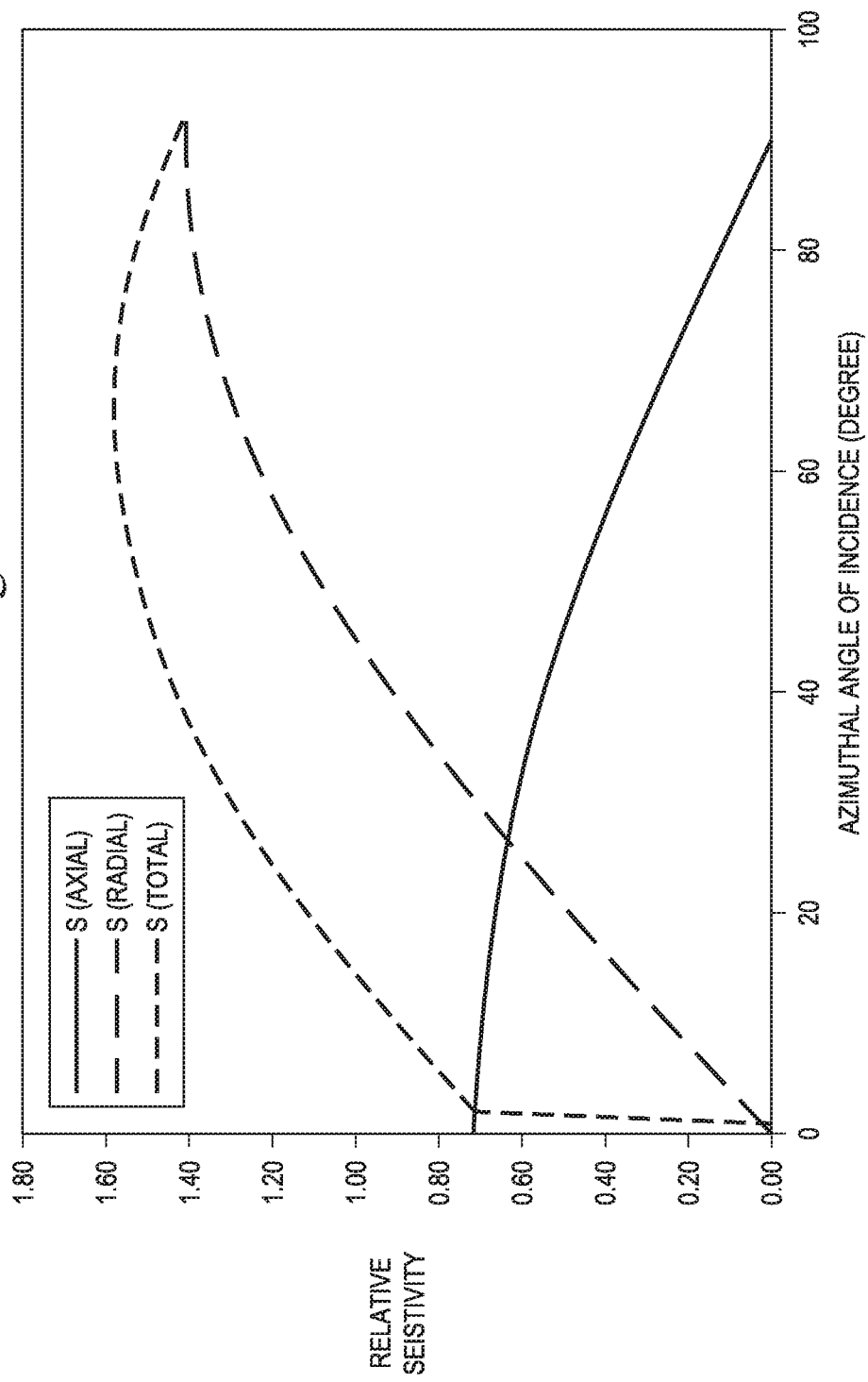
FIG. 7 illustrates the increase in sensitivity of a distributed acoustic cable in accordance with embodiments of the disclosure.

With polymer composite sensing cable package, the sensitivity can be enhanced not only by effective coupling with $\xi \approx 1$ but also by transverse stress loading that can be transferred to fiber with additional phase shift. Depending upon birefringent or elasto-optic effect the extra phase shift in Eq. (3) will come from three stress or strain components as expressed by $$\Delta n_x = -\{(p_{11} - 2\nu p_{12})\sigma_x + [(1-\nu)p_{12} - \nu p_{11}]^*[\sigma_y + \sigma_z]\}^* (n_x^3/2E) \quad (7)$$

$$\Delta n_y = -\{(p_{11} - 2\nu p_{12})\sigma_x + [(1-\nu)p_{12} - \nu p_{11}]^*[\sigma_x + \sigma_z]\}^* (n_y^3/2E) \quad (8)$$

$$\Delta n_z = -\{(p_{11} - 2\nu p_{12})\sigma_z + [(1-\nu)p_{12} - \nu p_{11}]^*[\sigma_x + \sigma_y]\}^* (n_z^3/2E) \quad (9)$$

where $\sigma_x$, $\sigma_y$, and $\sigma_z$ are the stress components in Cartesian coordinates, and the non-zero $\sigma_x$ and $\sigma_y$ components will make additional contribution to measured phase shift. The sensitivity of the fiber sensing cable can be expressed as $$\Delta\varphi/\varphi\varepsilon(z) = \{1 - (n^2/2) \cdot p_{12}\} \cdot \cos(\theta) \quad (10)$$

$$\Delta\varphi/\varphi\varepsilon(r) = \{1 + (n^2/2) \cdot (p_{11} + p_{12})\} \cdot \sin(\theta), \quad (11)$$

where $\varepsilon(z) = \varepsilon \cdot \cos(\theta)$, $\varepsilon(r) = \varepsilon \cdot \sin(\theta)$, $\theta$ is azimuthal angle of the incidence off the cable axis. In the case of the signal detection has a gauge length different from the DAS channel size, an integration has to be taken for obtaining averaged strain across full gauge length. The Eq. (10) corresponds to axial sensitivity while Eq. (11) is due to transverse or radial strain coupling. As shown in the FIG. 7, the relative sensitivity could be enhanced by a factor of 2 even at higher azimuthal angle of 60 degrees.

With reference back to FIGS. 1 and 2, and continuing reference to FIGS. 3, 5, and 6, an optical interrogation system 54 is disposed in optical communication with optical waveguide 120. In certain embodiments, the interrogation system 54 may drive an optical signal along the optical waveguide 120. In certain embodiments, the optical signal may be a pulsed light, such as pulsed laser from light source 52. In one or more embodiments, the fiber optic interrogation system 54 may be a Raman or Brillouin backscattering detector that detects and records backscattered light as a time-domain or frequency-domain reflectometry. Since strain from events such as leakage flow along the optical fiber create small changes in the refractive index of the optical fiber, the time of a backscattered signal can be correlated to a specific position along the optical fiber. By pulsing the laser repeatedly, other information such as the phase and/or frequency of the signal can be obtained. The cable 50 has maximum directional sensitivity in the lateral direction of the optical fiber, with minimal directional sensitivity in the axial direction of the optical fiber.

In one or more embodiments, the acoustic interrogation system 54 may be a Raman backscattering detector. The disclosure is not limited to any particular type of acoustic interrogation system, but may be selected based on the optical response for the particular downhole environment in which cable 50 is utilized.

Thus, it will be appreciated from the foregoing description that a method of monitoring a wellbore is enhanced by directly coupling an exterior surface of a distributed acoustic sensing cable to an optical waveguide within the cable by encasing the waveguide in a polymer composite so that the polymer composite forms an acoustic transmission layer that is in direct contact with the waveguide (as opposed to fiber optic strands loosely contained in a rigid tube). This allows a strain applied to the exterior surface of the cable, such as may occur from a leak in the wellbore, to be transmitted through the polymer composite layer to the waveguide. Backscattering of a signal propagated along the cable will occur at the point of the strain and an appropriate interrogator can be utilized to receive the backscattered signal and identify the location of the strain. In this way, the DAS cable can be deployed downhole and utilized to monitor conditions downhole with enhanced "listening" capabilities. In one or more embodiments, the method may comprise encasing the waveguide in a polymer composite having reinforcing fibers embedded in the polymer composite so that the polymer composite is in direct contact with the waveguide. The reinforcing fibers further enhance strain coupling.

As deployed, the distributed acoustic sensing cable 50 is utilized for acoustic sensing and employs one or more optical waveguides 120 to detect vibrations along the optical waveguide disposed along the wellbore 12. Coupling between external strain on cable 50 arising from vibrations and the optical waveguide 120 is enhanced by polymer composite 124 disposed to tightly encase the waveguide 120. While extruding the polymer composite 124 over the optical waveguide 120 is one preferred method of encasing the polymer composite 124 so as to form the desired acoustic coupling, the disclosure is not limited to extrusion to the extend such acoustic coupling can be achieved by other manufacturing methods. In any event, reinforcement fibers 128 may be embedded in the polymer composite 124 to even further enhance coupling and to provide strength to cable 50. The waveguide functions as an extended continuous fiber optic microphone, hydrophone, or accelerometer, whereby the vibrational energy is transformed into a dynamic strain along the optical waveguide.

Such strains within the optical waveguide act to generate a proportional optical path length and optical property changes measurable by various techniques. These techniques include, but are not limited to, interferometric (e.g., coherent phase Rayleigh), polarimetric, fiber Bragg grating wavelength shift, or photon-phonon-photon (Brillouin) frequency shift measurements for light waves propagating along the length of the optical waveguide.

Optical path length changes result in a similarly proportional optical phase change or Brillouin frequency/phase shift of the light wave at a particular distance-time, thus allowing remote surface detection and monitoring of vibration amplitude and location continuously along the optical fiber.

Coherent phase Rayleigh sensing may be utilized to perform Distributed Vibration Sensing (DVS) or Distributed Acoustic Sensing (DAS). Stimulated Brillouin sensing may be utilized to perform Distributed Strain Sensing (DSS) for sensing relatively static strain changes along optical waveguide 120 disposed linearly along the wellbore 12, but other techniques (such as coherent phase Rayleigh sensing) may be used if desired.

It should be understood that any optical detectors and any combination of optical detecting equipment may be connected to the optical waveguides 120 in keeping with the principles of this disclosure. For example, a coherent phase Rayleigh backscattering detector, an interferometer, or any other types of optical instruments may be used.

Figure 8:
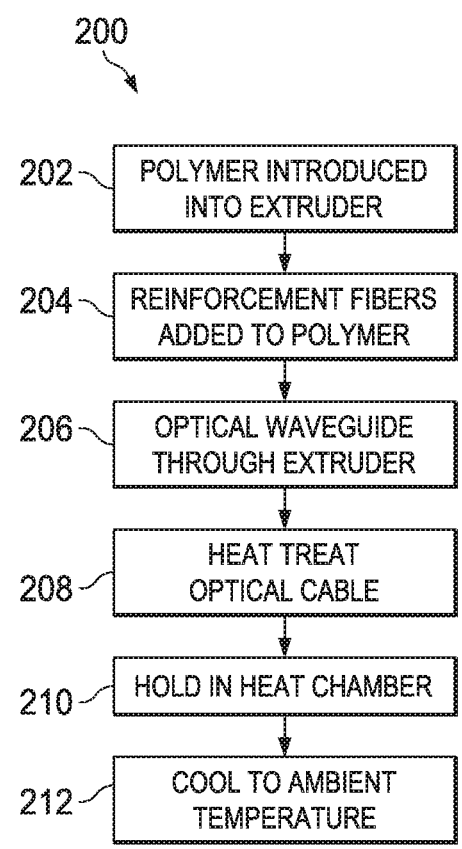
FIG. 8 shows a flow chart of one or more methods for manufacturing a distributed acoustic sensing cable.

FIG. 8 is a flow chart illustrating one or more embodiments of a distributed acoustic sensing cable manufacturing method 200 for manufacturing a DAS cable such as cable 50. Generally, an optical waveguide is encased by a polymer composite so as to form a polymer layer about the waveguide that is acoustically coupled to the waveguide, such as an optical fiber, to yield an optical cable. Reinforcement material, such as chopped or elongated fibers, may be embedded in the polymer composite. The optical cable may then be heat treated to enhance the crystallinity of the polymer composite.

More specifically, as shown in a first step 202, a polymer is introduced into an extruder. In one or more preferred embodiments, the polymer is polyphenylene sulfide (PPS) or polyimide (PI), or Polyetheretherketone (PEEK), although any crystalline polymer may be utilized. In one or more embodiments, the polymer may comprise at least a first polymer and a second polymer different from the first polymer. The first polymer is selected to have a first glass transition temperature and a first elastic modulus and the second polymer is selected to have a second glass transition temperature and/or a second elastic modulus different than the first polymer. For example, one or both of the second glass transition temperature and/or the second elastic modulus may be higher than the first glass transition temperature and the first elastic modulus. In one or more embodiments, the first glass transition temperature is at least 90 C and the first elastic modulus is at least 100 GPa.

In an optional step 204, reinforcement fibers may be added to the polymer to form a polymer composite. The fibers may be added to the polymer prior to introduction into the extruder or may be mixed with the polymer in the extruder. In one or more embodiments, the reinforcement fibers may be carbon fibers, ceramic fibers, glass fibers, synthetic fibers, and metallic fibers, while in other embodiments, two or more different types of fibers may be added to the polymer composite. In one or more embodiments, reinforced fibers are mixed with the polymer in an amount such that the volumetric percentage of the reinforcement fibers in the polymer ranges from 10% to 70%.

In step 206, an optical waveguide is guided through the extruder, and a polymer composite is extruded over the optical waveguide to encase the waveguide to form an optical cable where the polymer composite is acoustically coupled to the waveguide. In one or more embodiments, a first polymer may be applied to the optical waveguide and a second polymer is extruded over the waveguide. In such case, the first and second polymers may be the same or different materials. In one or more embodiments, the first polymer is polyimide and the second polymer is polyphenylene sulfide (PPS), polyimide (PI), or Polyetheretherketone (PEEK). To the extent reinforcement fibers are embedded in the polymer composite, during extrusion, the reinforcement fibers may be aligned in a select direction relative to the primary axis of the waveguide. For example, the fibers may be aligned to be substantially parallel to the primary axis, or substantially perpendicular to the primary axis or disposed at an angle therebetween. Alternatively, or in addition thereto, as the polymer composite is being extruded around the optical waveguide, one or more elongated reinforcement fiber strands may be disposed in the crystalline polymer extruded around the optical waveguide. The fiber strands may be braided so as to form a select angle with the primary axis of the waveguide.

In step 208, the optical cable is subjected to heat treating in order to increase the crystallinity and/or the elastic modulus of the polymer composite. The heat treating may include the step, in one or more embodiments, of passing the optical cable into a polymer composite material fabrication furnace, wherein the furnace has a fabrication temperature of between approximately 120° C.-180° C. The heat treating may continue until the polymer composite has a crystallinity of at least 20%, and preferably at least 30%. In other embodiments, the polymer composite may be heat treated until the polymer composite has a crystallinity of at least 75%.

In step 210, once the cable has been heat treated, the cable is subjected to post-heat treatment annealing. In this regard, the cable may be held in a heat chamber for a period of time to stabilize the optical cable microstructure for optimizing maximum crystallinity percentage. In one or more embodiments, the temperature of the heat chamber is maintained at between approximately 180° C. and 220° C. over the period of time the cable is in the heat chamber. In one or more embodiments, this period of time may be from approximately 5 to 20 hours. In one or more embodiments, the temperature may be gradually altered over the period of time to remove residual stress between the optical waveguide(s) and polymer composite matrix material. For example, the temperature may be gradually decreased in 50° C. from 220° C. to ambient temperature over the period of time from 5 to 20 hours.

In one or more preferred embodiments, the cable may be spooled with a select radial curvature while in the heat chamber to control flexible strain. In such case, the spool diameter in the heat chamber may be selected to be larger than the interfacial stress threshold between the polymer composite matrix and fiber waveguide(s).

Finally, in step 212, once the cable has been held in the heat chamber for the desired period of time, the cable is cool to ambient temperature. In one or more preferred embodiments, the cable is removed from the heat chamber and allowed to cool naturally to ambient temperature.

In one or more embodiments, a protection layer may be disposed around the polymer composite prior following extrusion. While the protection layer may be applied after heat treating, in one or more embodiments, the protection layer is formed of a crystalline polymer and applied prior to heat treating so that the polymer composite of the protection layer may be increased during heat treating. The protection layer may be selected so that the acoustic impedance of the protection layer is lower than the optical cable package.

Thus, a distributed acoustic sensor has been described. Embodiments of the distributed acoustic sensor system may generally include an elongated optical waveguide disposed along an axis; a polymer composite extruded over the waveguide to encase the waveguide in the polymer composite and acoustically couple the waveguide to the polymer composite; and a protective sheath disposed around the polymer composite. In other embodiments, a distributed acoustic sensor for wellbores has been described and generally includes an elongated optical waveguide disposed along an axis; a semi-polymer composite extruded over the waveguide encasing the waveguide so as to form an acoustic couple therebetween; and a multicity of reinforcement fibers embedded throughout the polymer composite. Likewise, a wellbore monitoring system has been described and may generally include an elongated tubular member disposed in a wellbore; an optical cable deployed along a length of the elongated tubular member, the optical cable comprising an elongated optical waveguide disposed along an axis of the cable; a polymer composite extruded over the waveguide to encase the waveguide in the polymer composite and acoustically couple the waveguide to the polymer composite; and a protective sheath disposed around the polymer composite; a light source in optical communication with the optical cable; and an interrogator in optical communication with the optical cable.

For any of the foregoing embodiments, the sensor or system may include any one of the following elements, alone or in combination with each other: the polymer composite forms an acoustic transmission layer coupled to the waveguide; the optical waveguide is an optical fiber cable; the optical waveguide is disposed along an axial length of a wellbore; the polymer composite is selected from the group consisting of polyetheretherketone (PEEK), polyimide (PI), polyphenylene sulfide (PPS), polyetherketone (PEEK), carbon fiber doped polyetherketone (c-PEEK) and metal-wire enhanced polyetherketone (m-PEEK), or combinations thereof; a plurality of optical wave guides encased in the polymer composite; the optical waveguide is an optical fiber; a multicity of reinforcement fibers embedded throughout the polymer composite; the reinforcement fibers are selected from the group consisting of carbon fibers, ceramic fibers, glass fibers, synthetic fibers, and metal fibers; the fibers comprise at least two types of fibers selected from the group consisting of carbon fibers, ceramic fibers, glass fibers, synthetic fibers, and metal fibers; the metal fibers are selected from the group consisting of ferromagnetic and non-ferromagnetic fibers such as stainless steel fibers, Ni-alloy fibers, and Se—CO fibers; the ratio of reinforced fibers to polymer composite is from 10% to 70%; the polymer composite material has its crystallinity percentage ranging from 20% to 70%; the sheath comprises a crystalline polymer; the crystalline polymer sheath is selected from the group consisting of polyetheretherketone (PEEK) and polyimide; the polymer composite is comprised of a polymer composite with a glass transition temperature (Tg) of approximately 120-220° C. or greater; the polymer composite comprises at least a first polymer and a second polymer different from the first polymer; the first polymer is characterized by a glass transition temperature of at least 90° C. and an elastic modulus of at least 100 GPa; the second polymer is characterized by a glass transition temperature and elastic modulus higher than first polymer material; the light source is tunable; an interrogator system comprises a Raman or Brillouin backscattering detector; at least a portion of the reinforcement fibers are substantially parallel with the axis of the waveguide; at least two optical wave guides embedded in the polymer composite; a first portion of the reinforcement fibers are aligned in a first direction and a second portion of the reinforcement fibers are aligned in a second direction different from the first direction; a multiplicity of the reinforcement fibers are approximately one to four inches in length; a plurality of elongated reinforcement fibers extending along the axis and embedded within the polymer composite; a wavelength division multiplexing (DWDM) switch; an optical coupler; at least two optical cables deployed in a wellbore wherein an interrogator system comprises a wavelength division multiplexing (DWDM) switch and an optical coupler in optical communication with the two optical cables; at least one optical cable is deployed outside a casing string and at least one optical cable is deployed inside the casing string; the polymer composite is thermoplastic material(s); the optical fiber is encased in the polymer composite to form a polymer composite layer acoustically coupled to the optical fiber; the optical fiber is single-mode fiber; the optical fibers are zero-dispersive single-mode and multi-mode fibers; a multicity of carbon fibers embedded throughout the polymer composite wherein at least 50% of the carbon fibers are aligned to have a fiber axis that is substantially parallel with the waveguide axis, and wherein the polymer composite comprises a crystalline polymer material; reinforcement fibers are carbon and wherein at least 20-50% of the carbon fibers are aligned to have a fiber axis that is substantially parallel with the waveguide axis; a protective sheath comprises a crystalline polymer; braided reinforcing fiber sheath disposed about the polymer composite; the braided reinforcing fiber sheath is disposed between the polymer composite and the protective sheath; the braided reinforcing fiber sheath comprises elongated fibers extending along axis; the elongated fibers extend along axis are at an angle of between 0-45 degrees relative to the axis; the elongated fibers extend along axis are at an angle of between 45-90 degrees relative to the axis; the elongated fibers extend along axis are at an angle of approximately 45 degrees relative to the axis; the distributed acoustic sensing system is a distributed vibrational sensor; an optical waveguide interrogation system in optical communication with the optical waveguide; an optical interrogation system that comprises a Rayleigh backscatter optical detector; an optical interrogation system that comprises a Brillouin backscatter optical detector; a plurality of optical waveguides extending along at least a portion of the length of a wellbore; a plurality of optical waveguides spaced apart around a perimeter of a wellbore; the optical waveguide is a single mode optical waveguide; the optical waveguide is a multi-mode optical waveguide; the optical waveguide is an optical fiber; the optical waveguide is an optical ribbon; a casing disposed in a wellbore, the casing having an exterior surface, wherein the optical waveguide is disposed proximate or adjacent the exterior surface of the casing; the optical waveguide is cemented in place proximate or adjacent the casing; the optical waveguide is permanently installed in the first wellbore; the optical waveguide is temporarily installed in the first wellbore; the optical waveguide is carried on a pipe string disposed within a wellbore.

A wellbore leak detection method has been described. Embodiments of the wellbore leak detection method may include coupling an exterior surface of a distributed acoustic sensing cable disposed in a wellbore to an optical waveguide by encasing the waveguide in a polymer composite so that the polymer composite is in contact with the optical waveguide; and transmitting through the polymer composite to the waveguide a strain applied to the exterior surface of the cable. Likewise, a method of manufacturing a distributed acoustic sensing cable for use in a wellbore has been described. The method of manufacturing a distributed acoustic sensing cable may include encasing an optical wave guide in a polymer composite to form an optical cable. Other embodiments of the method of manufacturing a distributed acoustic sensing cable may include mixing a plurality of reinforcement fibers with a crystalline polymer to form a composite material and introducing the composite material into an extruder; passing an optical fiber through the extruder; extruding the composite material over the optical fiber in order to encase the optical fiber within the composite material, thereby forming a polymer composite layer; increasing the crystallinity of the polymer composite layer by heat treating the cable; following heat treatment, annealing the cable by holding the cable in a heat chamber.

For the foregoing embodiments, the method may include any one of the following steps, alone or in combination with each other: propagating a signal source along the waveguide; and receiving a return signal source from the location of the applied strain; deploying the distributed acoustic sensing cable in a wellbore on a tubular member; embedding a plurality of reinforcement fibers throughout a crystalline polymer to form a polymer composite; selecting the reinforcement fibers from the group consisting of carbon fibers, ceramic fibers, glass fibers, synthetic fibers, and metal fibers; the ratio of reinforced fibers to polymer composite is from 10% to 70%; selecting the polymer forming the polymer composite from the group consisting of polyetheretherketone (PEEK), polyimide (PI), polyphenylene sulfide (PPS), polyetherketone (PEEK), carbon fiber doped polyetherketone (c-PEEK), metal-wire enhanced polyetherketone (m-PEEK) and polyaryletherketone (PAEK); combining at least two polymers to form the polymer composite; embedding comprises extruding the polymer composite around an optic fiber; extruding the polymer composite over at least two optic fibers of different optical characteristics; selecting a polymer composite with a crystallinity of at least 30%; heat treating the optical cable to increase the crystallinity of the polymer composite; heat treating comprises introducing the optical cable into a furnace and heating; heating the cable to a fabrication temperature of between 120-180° C. while in the furnace; post-heat treatment annealing of the sensing cable; annealing comprises holding the sensing cable in a heat chamber having a temperature of approximately 180° C. to approximately 220° C. over a period of time from approximately 5 to 20 hours in order to stabilize the microstructure of the polymer composite; gradually decreasing the temperature of the heat chamber to ambient temperature over a period of time to remove residual stress between the optical waveguide(s) and polymer composite; spooling the optical cable with a select radial curvature while in the heat chamber to control flexible strain of the optical cable; extruding a sheath around the polymer composite layer, wherein the sheath has a crystallinity and the sheath is selected from the group consisting of Polyetheretherketone (PEEK) polymer material or low-carbon fiber reinforced PEEK polymer material; extruding a sheath around the polymer composite, wherein the sheath has a crystallinity and the sheath is selected to have an acoustic impedance that is lower than the optical cable in order to enhance strain wavefield transmission; heat treating comprises either pulse heating or continuous heating in order to increase crystallinity and elastic modulus of the optical cable; the spool diameter in the isothermal chamber is selected to be larger than the interfacial stress threshold between the polymer composite matrix and fiber waveguide(s); introducing the polymer composite into an extruder; and urging the optical wave guide(s) through the extruder; mixing reinforcing fibers within the polymer composite prior to extruding the polymer composite over the optical wave guide(s); aligning at least a portion of the reinforcing fibers in select direction along a portion of the length of the optical cable package; the polymer composite comprises at least a first polymer and a second polymer different from the first polymer; a first polymer forming the polymer composite is characterized by a glass transition temperature of at least 90° C. and an elastic modulus of at least 100 GPa; a second polymer forming the polymer composite is characterized by a glass transition temperature and elastic modulus higher than first polymer; positioning the optical cable along at least a portion of the length of a wellbore; cementing the optical cable in place in the first wellbore; positioning the optical cable proximate or adjacent the exterior of tubular casing disposed in a wellbore; detecting vibrations along the optical cable; propagating an optical signal along an optical waveguide and measuring the returning signal; utilizing a light source to drive light along an optical waveguide; utilizing a polymer composite to form an acoustic transmission path between an optical waveguide and the exterior of a cable; measuring Brillouin backscattering; measuring Raman backscattering; measuring Rayleigh backscattering; measuring a characteristic of a wellbore utilizing the distributed sensing system, wherein the characteristic is selected from the group consisting of temperature, pressure, and vibration.

While the foregoing disclosure is directed to the specific embodiments of the disclosure, various modifications will be apparent to those skilled in the art. It is intended that all variations within the scope and spirit of the appended claims be embraced by the foregoing disclosure.

The invention claimed is:

1. A method of manufacturing a distributed optic fiber cable comprising:
   embedding a plurality of reinforcement fibers throughout a polymer composite;
   encasing an optical waveguide in the polymer composite to form an optical cable;
   heat treating the optical cable to increase a crystallinity of the polymer composite; and
   post-heat treatment annealing the optical cable, wherein annealing comprises holding the optical cable in a heat chamber having a temperature of approximately 180° C. to approximately 220° C. over a period of time from approximately 5 to 20 hours in order to stabilize the microstructure of the polymer composite.

2. The method of claim 1, further comprising selecting the plurality of reinforcement fibers from the group consisting of carbon fibers, ceramic fibers, glass fibers, synthetic fibers, and metal fibers.

3. The method of claim 1, wherein a ratio of the plurality of reinforcement fibers in the polymer composite is from 10% to 70%.

4. The method of claim 1, further comprising selecting the polymer forming the polymer composite from the group consisting of polyetheretherketone (PEEK), polyimide (PI), polyphenylene sulfide (PPS), polyetherketone (PEK), carbon fiber doped polyetherketone (c-PEEK), metal-wire enhanced polyetherketone (m-PEEK), and polyaryletherketone (PAEK).

5. The method of claim 4, further comprising combining at least two polymers to form the polymer composite.

6. The method of claim 1, wherein encasing comprises extruding the polymer composite around an optic fiber to form a polymer composite layer acoustically coupled to the optical wave guide.

7. The method of claim 6, further comprising extruding the polymer composite around at least two optic fibers of different optical characteristics.

8. The method of claim 1, further comprising selecting a polymer composite with a crystallinity of at least 30%.

9. The method of claim 1, wherein heat treating comprises introducing the optical cable into a furnace and heating.

10. The method of claim 9, further comprising heating the optical cable to a fabrication temperature of between 120-180° C. while in the furnace.

11. The method of claim 1, further comprising gradually decreasing the temperature of the heat chamber to ambient temperature over a period of time to remove residual stress between the optical waveguide and polymer composite.

12. The method of claim 1, further comprising spooling the optical cable with a select radial curvature while in the heat chamber to control flexible strain of the optical cable.

13. The method of claim 1, further comprising extruding a sheath around the polymer composite, wherein the sheath has a crystallinity and the sheath is selected from the group consisting of Polyetheretherketone (PEEK) polymer material or low-carbon fiber reinforced PEEK polymer material.

14. The method of claim 1, further comprising extruding a sheath around the polymer composite layer, wherein the sheath has a crystallinity and the sheath is selected to have an acoustic impedance that is lower than the optical cable in order to enhance strain wavefield transmission.

15. A method of manufacturing a distributed optic fiber cable comprising:
    mixing a plurality of reinforcement fibers with a crystalline polymer to form a polymer composite material and introducing the polymer composite material into an extruder;
    passing an optical fiber through the extruder;
    extruding the polymer composite material over the optical fiber in order to encase the optical fiber within the polymer composite material, thereby forming a polymer composite layer acoustically coupled to the optical fiber;
    increasing the crystallinity of the polymer composite layer by heat treating the distributed optical fiber cable;
    following heat treatment, annealing the distributed optical fiber cable by holding the distributed optical fiber cable in a heat chamber having a temperature of approximately 180° C. to approximately 220° C. over a period of time from approximately 5 to 20 hours in order to stabilize the microstructure of the polymer composite.

16. The method of claim 15, further comprising gradually decreasing the temperature of the heat chamber to ambient temperature over a period of time to remove residual stress between the optical fiber and polymer composite.

* * * * *